US008862924B2

(12) United States Patent
Emberling et al.

(10) Patent No.: US 8,862,924 B2
(45) Date of Patent: Oct. 14, 2014

(54) PROCESSOR WITH POWER CONTROL VIA INSTRUCTION ISSUANCE (75) Inventors: Brian D. Emberling, Palo Alto, CA (US); Stephen D. Presant, San Jose, CA (US); Seth Hendrickson, Ames, IA (US); Krishna Sitaraman, San Jose, CA (US); Ali Ibrahim, Oakland, CA (US); Jeff Herman, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 310 days.

(21) Appl. No.: 13/296,873

(22) Filed: Nov. 15, 2011

(65) Prior Publication Data
US 2013/0124900 A1   May 16, 2013

(51) Int. Cl.
G06F 1/00   (2006.01)
(52) U.S. Cl.
USPC ......................................................... 713/340
(58) Field of Classification Search
USPC ................................................ 713/300–340
See application file for complete search history.

(56) References Cited

U.S. PATENT DOCUMENTS

| | | | |
|---|---|---|---|
| 3,816,716 A * | 6/1974 | De Garmo | 701/400 |
| 4,001,690 A | 1/1977 | Mack et al. | |
| 4,550,369 A | 10/1985 | Rokutanda et al. | |
| 4,611,289 A | 9/1986 | Coppola | |
| 5,021,679 A | 6/1991 | Fairbanks et al. | |
| 5,072,376 A | 12/1991 | Ellsworth et al. | |
| 5,167,024 A | 11/1992 | Smith et al. | |
| 5,218,704 A | 6/1993 | Watts, Jr. et al. | |
| 5,268,845 A | 12/1993 | Startup et al. | |
| 5,303,095 A | 4/1994 | Vuong | |
| 5,365,552 A | 11/1994 | Astle | |
| 5,396,635 A | 3/1995 | Fung | |
| 5,408,639 A | 4/1995 | Gulick et al. | |
| 5,410,711 A | 4/1995 | Stewart | |
| 5,412,780 A | 5/1995 | Rushton | |
| 5,416,726 A | 5/1995 | Garcia-Duarte et al. | |
| 5,428,790 A | 6/1995 | Harper et al. | |
| 5,442,794 A | 8/1995 | Wisor et al. | |
| 5,461,266 A | 10/1995 | Koreeda et al. | |
| 5,465,367 A | 11/1995 | Reddy et al. | |
| 5,481,690 A | 1/1996 | Grumlose et al. | |
| 5,623,677 A | 4/1997 | Townsley et al. | |
| 5,719,800 A * | 2/1998 | Mittal et al. | 713/321 |
| 5,835,746 A * | 11/1998 | Girardeau et al. | 712/215 |
| 6,029,006 A * | 2/2000 | Alexander et al. | 713/323 |
| 6,125,450 A | 9/2000 | Kardach | |
| 6,415,388 B1 * | 7/2002 | Browning et al. | 713/322 |
| 6,564,328 B1 * | 5/2003 | Grochowski et al. | 713/320 |

(Continued)

Primary Examiner — Paul R Myers
(74) Attorney, Agent, or Firm — Park, Vaughan, Fleming & Dowler, LLP (57) ABSTRACT Methods and apparatuses are provided for power control in a processor. The apparatus comprises a plurality of operational units arranged as a group of operational units. A power consumption monitor determines when cumulative power consumption of the group of operational units exceeds a threshold (e.g., either or both of the cumulative power threshold and the cumulative power rate threshold) during a time interval, after which a filter for issuing instructions to the group of operational units suspends instruction issuance to the group of operational units for the remainder of the time interval. The method comprises monitoring cumulative power consumption by a group of operational units within a processor over a time interval. If the cumulative power consumption of the group of operational units exceeds the threshold, instruction issuance to the group of operational units is suspended for the remainder of the time interval.

18 Claims, 5 Drawing Sheets

(56) References Cited

U.S. PATENT DOCUMENTS

| | | | |
|---|---|---|---|
| 6,633,987 | B2 | 10/2003 | Jain et al. |
| 7,047,336 | B2 | 5/2006 | Lin et al. |
| 7,111,179 | B1 * | 9/2006 | Girson et al. ................. 713/300 |
| 7,114,086 | B2 | 9/2006 | Mizuyabu et al. |
| 7,167,994 | B2 | 1/2007 | Zdravkovic |
| 7,269,751 | B2 * | 9/2007 | Janakiraman et al. ........ 713/323 |
| 7,281,140 | B2 * | 10/2007 | Burns et al. ................... 713/300 |
| 7,284,137 | B2 * | 10/2007 | Clark et al. ................... 713/300 |
| 7,330,988 | B2 * | 2/2008 | Golla et al. ................... 713/322 |
| 7,337,339 | B1 * | 2/2008 | Choquette et al. ............ 713/320 |
| 7,418,608 | B2 * | 8/2008 | Kumar et al. ................. 713/320 |
| 7,444,526 | B2 * | 10/2008 | Felter et al. ................... 713/300 |
| 7,689,849 | B2 | 3/2010 | Sokorac |
| 7,779,276 | B2 * | 8/2010 | Bolan et al. ................... 713/300 |

* cited by examiner

PROCESSOR WITH POWER CONTROL VIA INSTRUCTION ISSUANCE

FIELD OF THE INVENTION

The technical field relates to the field of data or graphics processor architecture. More specifically, this invention relates to the field of achieving power control with a processor via varying instruction issuance for a group of processor operational units.

BACKGROUND

Information or data processors are found in many contemporary electronic devices such as, for example, personal computers, game playing devices and video equipment. Modern processors include extensive execution resources to support concurrent processing of multiple instructions. A processor typically includes several operational units including: integer, floating point, branch, and memory units. Additionally, register files and on-chip caches are also provided to supply the operational units with operands. This is particularly evident in graphics processors, which typically have a large number of operational units and registers compared to general purpose processors. When fully engaged by an executing program, these operational units can create significant power dissipation issues.

To conserve power, a processor may employ power throttling, such as by gating a clock signal to cut off the clock signal delivered to operational units that are not used by an executing instruction sequence. Alternately (or additionally), a processor may limit an operational unit's operating frequency by slowing the clock signal for that operational unit. Power throttling may also be implemented through altering the number of instructions processed by an operational unit per clock cycle (instruction throttling) or by suspending instruction issuance for an operational unit for a time period. These and other power control mechanisms have their particular advantages and disadvantages.

BRIEF SUMMARY OF EMBODIMENTS OF THE INVENTION

An apparatus is provided for power control in a processor by modifying instruction issuance. The apparatus comprises a plurality of operational units arranged as a group of operational units. A power consumption monitor determines when the cumulative power consumption of the group of operational units exceeds a threshold, after which a filter for issuing instructions to the group of operational units modifies instruction issuance to the group of operational units.

In another embodiment, apparatus is provided for power control in a processor by modifying instruction issuance. The apparatus comprises a plurality of operational units arranged as a group of operational units. A power consumption monitor determines when the cumulative power consumption of the group of operational units exceeds a threshold during a time interval, after which a filter for issuing instructions to the group of operational units suspends instruction issuance to the group of operational units for the remainder of the time interval.

A method is provided for controlling power consumption in a processor via modifying instruction issuance. The method comprises monitoring the cumulative power consumption by a group of operational units within a processor and modifying instruction issuance to the group of operational units responsive to the cumulative power consumption of the group of operational units exceeding a threshold.

In another embodiment, a method is provided for controlling power consumption in a processor via modifying instruction issuance. The method comprises monitoring the cumulative power consumption by a group of operational units within a processor over a time interval. If the cumulative power consumption of the group of operational units exceeds a threshold, instruction issuance to the group of operational units is suspended for the remainder of the time interval.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. Moreover, as used herein, the word "processor" encompasses any type of information or data processor, including, without limitation, Internet access processors, Intranet access processors, personal data processors, military data processors, financial data processors, navigational processors, voice processors, music processors, video processors or any multimedia processors. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular processor microarchitecture.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to processor architecture and other functional aspects of a processor system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-4 are merely illustrative and may not be drawn to scale.

Figure 1:
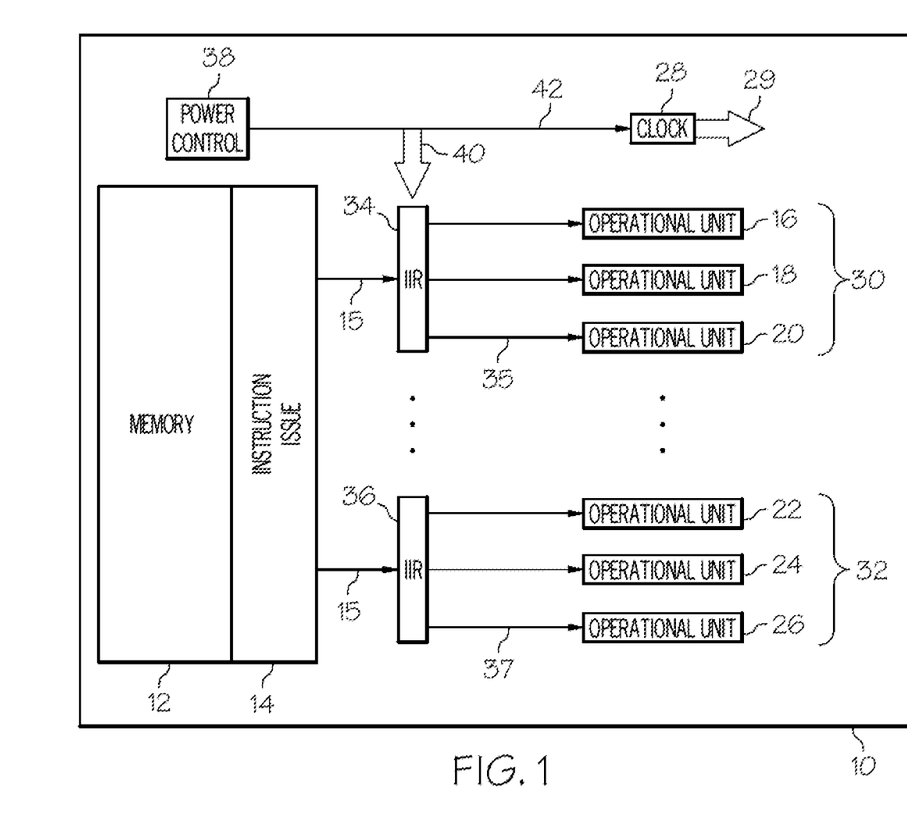
FIG. 1 is a simplified exemplary block diagram of processor suitable for use with the embodiments of the present disclosure.

Referring now to FIG. 1, a simplified exemplary block diagram is shown illustrating a processor 10 suitable for use with the embodiments of the present disclosure. In some embodiments, the processor 10 would be realized as a single core in a large-scale integrated circuit (LSIC). In other embodiments, the processor 10 could be one of a dual or multiple core LSIC to provide additional functionality in a single LSIC package. As is typical, processor 10 includes a memory section 12 containing programs or instructions for execution by the processor 10. The memory 12 can be any type of suitable memory. This would include the various types of dynamic random access memory (DRAM) such as SDRAM, the various types of static RAM (SRAM), and the various types of non-volatile memory (PROM, EPROM, and flash). The processor 10 also includes an instruction issuance unit 14. In a graphics processor embodiment, the instruction issuance unit 14 is commonly referred to as a sequencer, while in general purpose processing embodiment the instruction issuance unit 14 is commonly referred to as a scheduler.

The processor 10 of FIG. 1 also includes a plurality of operational units 16-26. These operation units may be include floating-point units (FPU) that performs the float-point computations, integer processing units for performing integer computations or graphics processing units performing various specialized graphic or imaging tasks. According to various exemplary embodiments, the plurality of operation units 16-26 are organized into one or more groups (30 and 32 shown) with each group of operational units having a filter (34 and 36 shown) providing instructions to the group for execution. In some embodiments, the filters 34 and 36 comprise infinite impulse response (IIR) filters that are positioned between the instruction issue unit 14 and the group of operational units 30 or 32. In operation, the filters 34 and 36 receive (or fetch) instructions (via data lines 15) and monitor the cumulative power consumption of the group of operational units (30 and 32 respectively). So long as the cumulative power consumption of the group of operational units does not exceed a threshold, the filters 34 and 36 continue to provide instructions (or allow instructions to be fetched) to the respective group of operational units 30 and 32 (via data lines 35 and 37 respectively). In one embodiment, the threshold comprises a cumulative power threshold for the group of operational units. In another embodiment, the threshold comprises a cumulative power rate threshold (i.e., rate of change) for the group of operational units. In yet another embodiment, both thresholds may be employed for group power monitoring. That is, by monitoring the power consumption of a group of operational units, one operational unit (for example 16) may be significantly increasing its power consumption. However, if another operational unit (for example 20) of the same group of operational units 30 were decreasing power consumption so that the cumulative power consumption of the group of operational units 30 remained below the cumulative power threshold or the cumulative power rate threshold (as the case may be), the filter 34 would continue to issue instructions. Conversely, once the power consumption of the group of operational units 30 or 32 exceeds the cumulative power threshold or the cumulative power rate threshold, the filters 34 or 36 cease to issue instructions to the operational units. In some embodiments, instruction issuance is based upon a time interval and instruction issuance is suspended for the remainder of that time interval from the point during the time interval where the cumulative power threshold or the cumulative power rate threshold was exceeded as will be discussed in more detail below.

The processor 10 also includes a power control module 38 that programs (via programming lines 40) the filters 34 and 36 based upon the power requirements of the processor. For example, the power control module 38 may provide the instruction issuance time interval duration, the cumulative power threshold, cumulative power rate threshold and other parameters to the filters 34 and 36. The power control module 38 may also vary (via programming line 42) the internal clock 28 of the processor 10 to achieve additional control over power consumption by modulating the clock signal 29.

Figure 2:
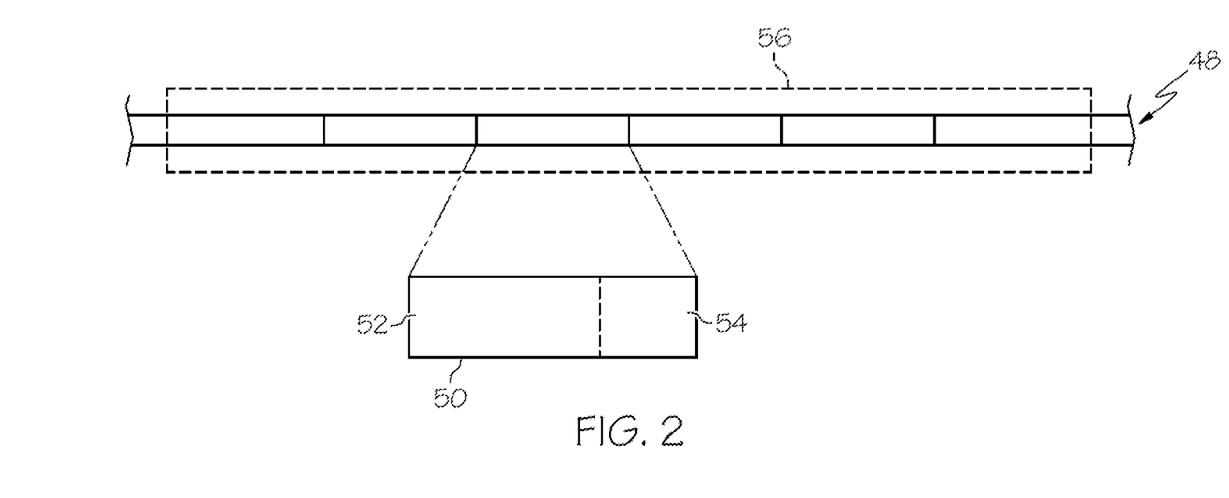
FIG. 2 is a simplified instruction issuance timing diagram for the filters of FIG. 1.

Referring now to FIG. 2, an illustration of a sequence 48 of time intervals 50 are shown. At the beginning (52) of each time interval 50 the filters (34 and 36 of FIG. 1) begin to issue instruction to the respective group of operational units (30 and 32 respectively). If the threshold employed (e.g., either or both of the cumulative power threshold and the cumulative power rate threshold) is not exceeded by the cumulative power consumption of the group of operational units, instructions may issue for the entire duration of the time interval 50. However, if the threshold is exceeded by the cumulative power consumption of the group of operational units, instructions cease to issue for a remainder 54 of the time interval 50. Instructions then begin to issue again at the beginning of the next time interval. In some embodiments, the threshold for the time interval 50 is determined by the filters (34 and 36 in FIG. 1) based upon an average of instructions issued over a second (long term) time interval 56. In such embodiments, the second time interval 56 becomes a long-term average time window and the time interval 50 operates as a short-term instruction issuance time window. While the second time interval 56 as illustrated in FIG. 2 has a duration of six time intervals 50, in practice any number of time intervals 50 may be averaged during the second time interval 56.

Generally, it is convenient to have durations for both the time interval 50 and the second time interval 56 set to a multiple of the clock signal (29 in FIG. 1) frequency. However, it will be appreciated that with such an arrangement, it is possible that the one or more groups of operational units may cease to issue instructions at approximately the same time (the remainder 54 of each respective time interval 50). The result of this condition could be an ebb and surge of power consumed by the processor (10 in FIG. 1) occurring at a frequency that is a multiple (harmonic) of the resonance frequency of the processor. That is, due to intentional and parasitic capacitance and inductance in the packaging containing the processor, each packaged processor will have a resonance frequency. Moreover, if the power control module (38 of FIG. 1) varies (via programming line 42) the clock (28 of FIG. 1) to modulate the clock signal (29 of FIG. 1) frequency in accordance with dynamic voltage and frequency scaling (or some other power control feature), power surges could occur at a variety of frequencies which would increase the possibility of power surges occurring at a multiple of the package resonance frequency. Should power surges occur at a multiple of this resonance frequency, the efficiency of the power control module (38 of FIG. 1) to control power distribution within the processor 10 could be greatly reduced.

Figure 3:
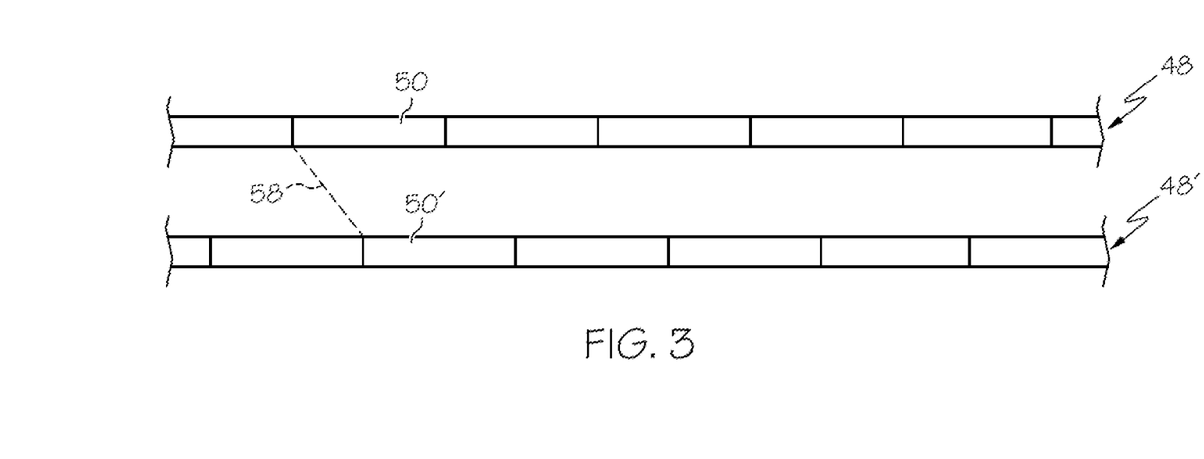
FIG. 3 is an alternate simplified instruction issuance timing diagram for the filters of FIG. 1.

Accordingly, the exemplary embodiments of the present disclosure contemplate a number of options to prevent such a resonance condition from occurring. In some embodiments, the filters (34 and 36 in FIG. 1) are dynamically programmable by the power control module (38 in FIG. 1) for parameters such as the durations of the time interval 50 and the second time interval 56, the permitted instruction issue rate increase from the previous time interval 50, or the minimum and/or maximum instruction issue rate. Also, some embodiments of the present disclosure prefer to issue instructions to the various groups of operational units (30 and 32 in FIG. 1) out-of-phase as shown in FIG. 3. That is, one sequence 48 of time intervals 50 may issue (for example from filter 34) at one phase relation to the clock (28 in FIG. 1), while another one sequence 48' of time intervals 50' may issue (for example from filter 36) at a different phase relation to the clock as indicated by the reference line 58. Such a phase arrangement for instruction issuance to the groups of operational units assures that should one group of operational units (for example 30 in FIG. 1) exceed the threshold, instructions to that group would cease for the remainder of a time period. However, that remainder would be aligned at or near the beginning of a time interval for another group of operational units (for example 32 in FIG. 1) maintaining the overall power consumption and/or rate of power consumption of the processor (10 in FIG. 1) at a more even level and without significant power surges.

Figure 4:
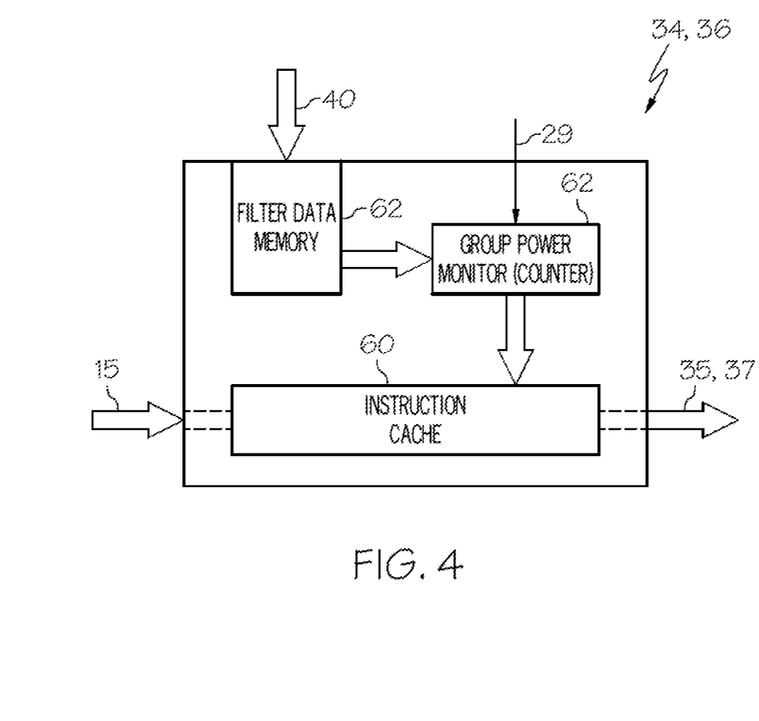
FIG. 4 is a block diagram illustrations the functions performed by the filters of FIG. 1 in accordance with exemplary embodiments.

Referring now to FIG. 4, a block diagram is shown illustrating the functions provided by the filters (34 or 36 of FIG. 1) in accordance with exemplary embodiments. Instructions to be executed by the group of operational units are received via data lines 15 and the instructions are held in an instruction cache 60. Instructions are issued to (or fetched by) an operational unit (for example, one of 16-18) of a group of operational units (for example, 30) provided that the group power monitor 62 determines that the cumulative power consumption of the group of operational units remains below a threshold (e.g., either or both of the cumulative power threshold and the cumulative power rate threshold). In the event that the cumulative power consumption of a group of operational units exceeds the threshold, then the group power monitor 62 of the filter 34 or 36 ceases to issue instructions (or allow instructions to be fetched) for the remainder of a time interval (50 in FIG. 2). As discussed above, the duration of the (short-term) time interval is provided by the programming (40) of the power control module (38 in FIG. 1) along with the duration of a second (long-term) time interval (56 in FIG. 2). The second time interval is used to determine an average instruction issuance rate over the second time interval, which in turn is used to determine the threshold for cumulative power consumption by the group of operational units associated with that filter.

Other parameters programmed by the power control module and stored in a filter data memory 62 include any allowed instruction issuance rate changes (e.g., threshold adjustments) for subsequent short-term time intervals from previous time intervals. Also, a minimum or maximum instruction issue rate may be programmed into the filter, which varies the speed in which a group of operational units could achieve the threshold value within the short-term time interval. During power state changes of the processor (10 in FIG. 1), the maximum instruction issuance rate can facilitate maintenance of activity and power consumption at a reduced level. In lower power states, the minimum instruction issuance rate can relax (or not limit) instruction issuance if the lower power states generally present little or no power consumption issues.

The group power monitor 62 may have various embodiments such as a counter that counts the instructions issued to the group of operational units during the short-term time interval. In some embodiments, a simple running count of instructions issued is accumulated and compared to the threshold. In other embodiments, double-word instructions are counted as two instructions since double-word instructions typically consume twice as much power as single-word instructions. Other arrangements and features including, but not limited to, weighted averaging, power state offset, calibration and modulation of the clock signal (29 in FIG. 1) frequency is possible.

Figure 5:
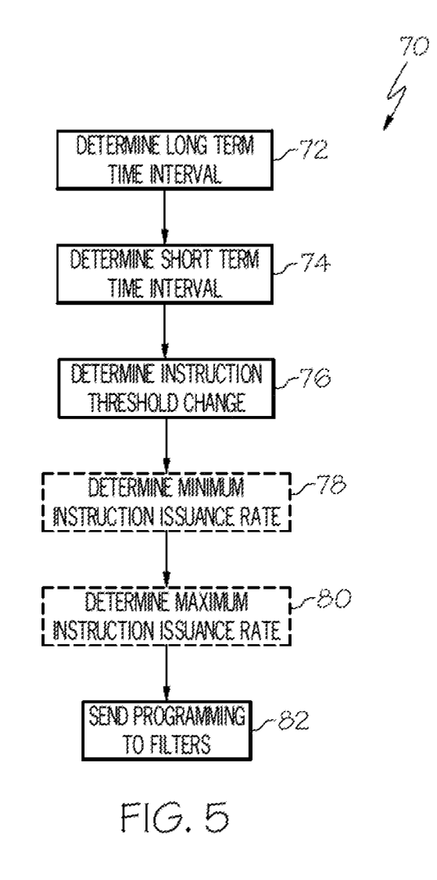
FIG. 5 is a flow diagram illustrating an exemplary method performed by the power control module of FIG. 1 in accordance with exemplary embodiments.

Referring now to FIG. 5, a flow diagram illustrating the method 70 performed by the power control module (38 in FIG. 1) is shown. The various tasks performed in connection with the process 70 of FIG. 5 may be performed by software, hardware, firmware, or any combination thereof. For illustrative purposes, the following description of the process of FIG. 5 may refer to elements mentioned above in connection with FIGS. 1-4. In practice, portions of the process 70 of FIG. 5 may be performed by different elements of the described system. It should also be appreciated that the process of FIG. 5 may include any number of additional or alternative tasks and that the process 70 of FIG. 5 may be incorporated into a more comprehensive procedure or process having additional functionality not described in detail herein. Moreover, one or more of the tasks shown in FIG. 5 could be omitted from an embodiment of the process of FIG. 5 as long as the intended overall functionality remains intact.

The routine begins in step 72 where the second (long-term) time interval (56 in FIG. 2) is determined. Next, step 74 determines the time interval (50 in FIG. 2), which comprises the short-term instruction issuance window for the group of operational units (30 or 32 of FIG. 2). Next, it is determined in step 76 if the instruction threshold for the time interval 50 will be changed for subsequent time intervals. As noted above, in one embodiment the change would be for an increase or decrease in the cumulative power threshold. In another embodiment, the change would be for an increase or decrease in the cumulative power rate threshold (i.e., rate of change). Optionally, the power control module may determine a minimum instruction issue rate (step 78) and/or a maximum instruction issue rate (step 80) prior to sending all programming data (via programming lines 40 in FIG. 2) to the filters (34 or 36 in FIG. 2).

Figure 6:
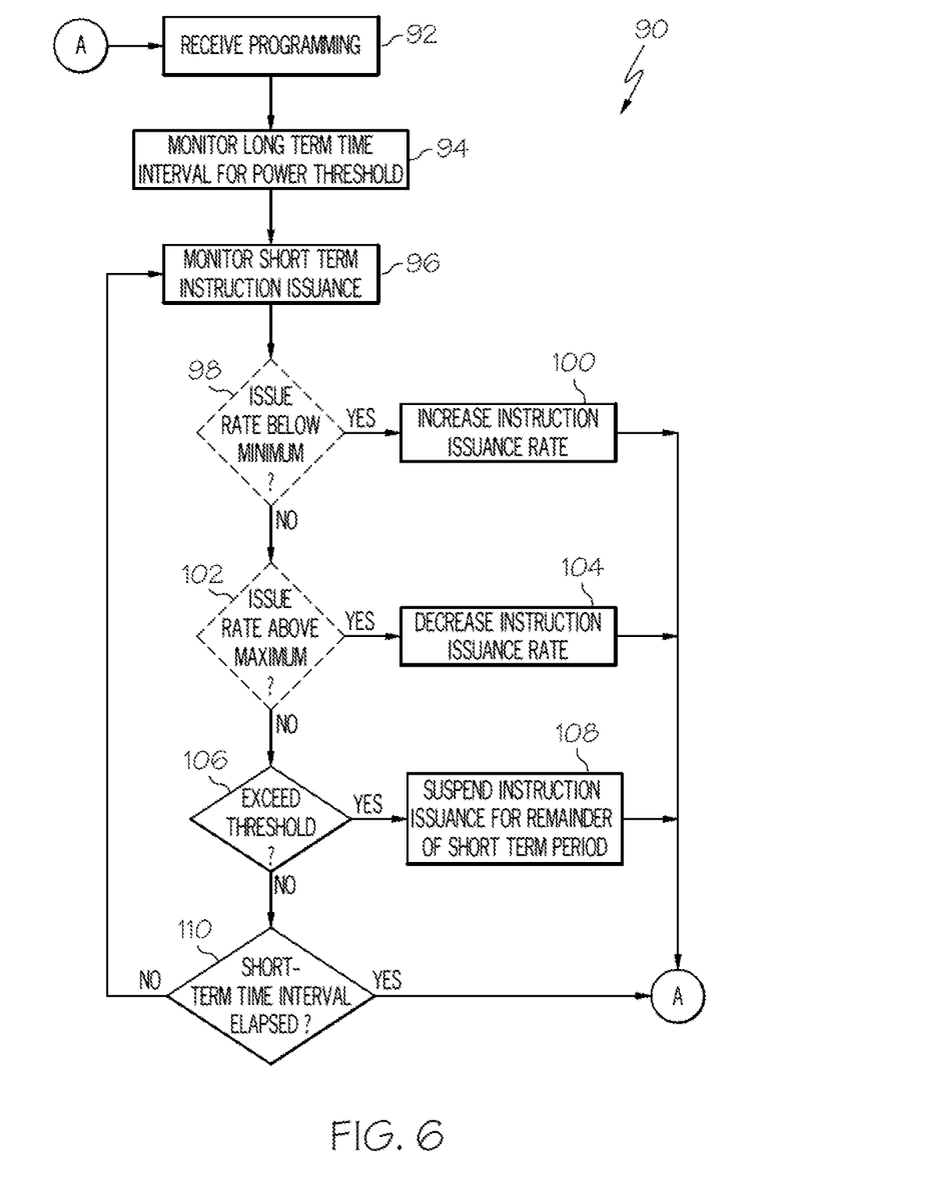
FIG. 6 is a flow diagram illustrating an exemplary method performed by the filter of FIG. 4 in accordance with exemplary embodiments.

Referring now to FIG. 6, a flow diagram illustrating the method 90 performed by the filters (33 or 36 in FIG. 1) is shown. The various tasks performed in connection with the process 90 of FIG. 6 may be performed by software, hardware, firmware, or any combination thereof. For illustrative purposes, the following description of the process of FIG. 6 may refer to elements mentioned above in connection with FIGS. 1-4. In practice, portions of the process 90 of FIG. 6 may be performed by different elements of the described system. It should also be appreciated that the process of FIG.

6 may include any number of additional or alternative tasks and that the process 90 of FIG. 6 may be incorporated into a more comprehensive procedure or process having additional functionality not described in detail herein. Moreover, one or more of the tasks shown in FIG. 6 could be omitted from an embodiment of the process of FIG. 6 as long as the intended overall functionality remains intact.

The routine begins in step 92 where programming from the power control module (38 in FIG. 1) is received and stored in filter data memory (62 in FIG. 4). Next, step 94 monitors the instruction issuance over the second (long-term) time interval (56 in FIG. 2) and determines the threshold value (e.g., instruction count) for the time interval (50 in FIG. 2), which may include an allowed increase over previous short-term time intervals if allowed by the power control module (step 76 in FIG. 5). Step 96 begins the monitoring of the cumulative power consumption of a group of operational units (for example, 30 in FIG. 1). In some embodiments, power monitor comprises counting issued instructions to the group of operational units and comparing the accumulated count to the threshold. As noted, earlier, some embodiments count double-word instructions as two instructions for the instruction count.

Optionally, the filter monitors the minimum and maximum allowed instruction issue rates. Accordingly, decision 98 determines whether the current instruction issue rate is below the minimum instruction issue rate. If so, the rate of instruction issuance is allowed to increase (step 100). Next, decision 102 determines whether the current instruction issue rate is above the maximum instruction issue rate. If so, the rate of instruction issuance is reduced in step 104. If the instruction issue rate is determined by decisions 98 and 102 to be within the minimum and maximum allowed instruction issue rates, decision 106 determines whether the cumulative power consumption for the group of operational units (30 in FIG. 1) exceeds the threshold (e.g., either or both of the cumulative power threshold and the cumulative power rate threshold). If so, further instruction issuance to the group of operational units is suspended (step 108) for the remainder of the time interval (see, 54 in FIG. 2). If the threshold has not been reached, decision 110 determines whether the time interval (50 in FIG. 2) has elapsed. If not, the routine returns to step 96 for continued monitoring of short-term instruction issuance (and thus cumulative power consumption). If the short-term time interval has elapsed, or after completing the tasks of steps 100, 104 or 108, the routine returns to step 92 where any new or changed programming received from the power control module (38 in FIG. 1) is stored in the filter and processed to achieve power control management for the processor (10 in FIG. 1).

Various processor-based devices that may advantageously use the processor (or any computational unit) of the present disclosure include, but are not limited to, laptop computers, digital books or readers, printers, scanners, standard or high-definition televisions or monitors and standard or high-definition set-top boxes for satellite or cable programming reception. In each example, any other circuitry necessary for the implementation of the processor-based device would be added by the respective manufacturer. The above listing of processor-based devices is merely exemplary and not intended to be a limitation on the number or types of processor-based devices that may advantageously use the processor (or any computational) unit of the present disclosure.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure, it being understood that various changes may be made in the function and arrangement of elements described in an exemplary embodiment without departing from the scope of the disclosure as set forth in the appended claims and their legal equivalents.

What is claimed is:

1. A method, comprising:
    determining, using an average of instructions issued over a second time interval, a duration for a time interval during which a number of instructions that is issued to a group of operational units within the processor is to be determined;
    monitoring cumulative power consumption by a group of operational units within a processor, the monitoring comprising determining a number of instructions issued to the group of operational units during the time interval; and
    modifying instruction issuance to the group of operational units responsive to the cumulative power consumption of the group of operational units exceeding a threshold.

2. The method of claim 1, wherein modifying instruction issuance to the group of operational units comprises modifying instruction issuance responsive to the cumulative power consumption of the group of operational units exceeding a cumulative power threshold.

3. The method of claim 1, wherein modifying instruction issuance to the group of operational units comprises modifying instruction issuance responsive to the cumulative power consumption of the group of operational units exceeding a cumulative power rate threshold.

4. The method of claim 1, wherein modifying instruction issuance to the group of operational units comprises ceasing issuance of instructions to the group of operational units in response to exceeding the threshold.

5. The method of claim 1, wherein determining the number of instructions issued to the group of operational units comprises counting each instruction issued to the group of operational units during the time interval.

6. The method of claim 5, wherein determining the number of instructions issued to the group of operational units comprises counting each double-word instruction issued to the group of operational units as two instructions.

7. The method of claim 1, wherein modifying instruction issuance to the group of operational units comprises ceasing issuance of instructions to the group of operational units for a remainder of the time interval in response to the number of instructions exceeding the threshold.

8. The method of claim 1, wherein the second time interval exceeds the time interval.

9. The method of claim 1, further comprising:
    increasing instruction issuance to the group of operational units when instructions are issuing below a minimum instruction issuance rate.

10. The method of claim 1, further comprising:
    decreasing instruction issuance to the group of operational units when instructions are issuing above a maximum instruction issuance rate.

11. A processor, comprising:
    a plurality of operational units arranged as a group of operational units;

a power consumption monitor for determining when cumulative power consumption of the group of operational units exceeds a threshold during a time interval;

a filter for issuing instructions to the group of operational units, the filter being responsive to a determination that the cumulative power consumption exceeds the threshold to modify instruction issuance to the group of operational units; and a power management unit configured to determine a duration for the time interval based at least in part on an average of instructions issued over a second time interval having a duration exceeding the time interval.

12. The processor of claim 11, wherein the filter comprises an infinite impulse response filter and the power consumption monitor comprises a counter configured within the infinite impulse response filter for counting each instruction issued to the group of operational units during the time interval.

13. The processor of claim 12, wherein each double-word instruction issued to the group of operational units is counted as two instructions by the counter.

14. The processor of claim 12, wherein the filter ceases issuance of instructions to the group of operational units for a remainder of the time interval after the number of instructions indicates that the cumulative power consumption exceeds the threshold.

15. The processor of claim 12, wherein the filter is configured to:

decrease instruction issuance to the group of operational units when instructions are issuing above a maximum instruction issuance rate; and increase instruction issuance to the group of operational units when instructions are issuing below a minimum instruction issuance rate.

16. The processor of claim 11, which includes a clock unit configured to provide a clock signal to the group of operational units, wherein the power management unit is configured to determine a duration for the time interval based at least in part on the average of instructions issued over the second time interval and a frequency multiple of the clock signal.

17. The processor of claim 11, further comprising a plurality of groups of operational units, each group of operational units having a respective power consumption monitor and filter.

18. The processor of claim 11, further comprising a sequencer or scheduler issuing instructions to the filter of each of the plurality of groups of operational units out of phase from one another.

* * * * *